United States Patent
Umemura et al.

(10) Patent No.: US 6,315,301 B1
(45) Date of Patent: Nov. 13, 2001

(54) SEAL APPARATUS FOR ROTARY MACHINES

(75) Inventors: Sunao Umemura; Jun Kubota; Koichi Akagi; Masaki Ono, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/423,003

(22) PCT Filed: Feb. 22, 1999

(86) PCT No.: PCT/JP99/00769
 § 371 Date: Oct. 29, 1999
 § 102(e) Date: Oct. 29, 1999

(87) PCT Pub. No.: WO99/45297
 PCT Pub. Date: Sep. 10, 1999

(30) Foreign Application Priority Data

Mar. 2, 1998 (JP) .................................................. 10-049441

(51) Int. Cl.⁷ ....................................................... F16J 15/16
(52) U.S. Cl. ......................... 277/545; 277/581; 277/589
(58) Field of Search ................................... 277/543, 544, 277/545, 580, 581, 589, 498

(56) References Cited

U.S. PATENT DOCUMENTS

| | | | |
|---|---|---|---|
| 1,353,082 | * | 9/1920 | Stehle et al. ........................... 277/498 |
| 2,638,390 | * | 5/1953 | Neeme ............................. 277/498 X |
| 4,251,083 | * | 2/1981 | Montes .................................. 277/498 |
| 4,537,024 | * | 8/1985 | Grosjean . | |
| 5,221,096 | * | 6/1993 | Heldreth et al. . | |
| 5,865,600 | * | 2/1999 | Mori et al. . | |
| 5,997,247 | * | 12/1999 | Arraitz et al. ................... 277/543 X |

FOREIGN PATENT DOCUMENTS

| | | |
|---|---|---|
| 58-96105 | 6/1983 | (JP) . |
| 3-141804 | 6/1991 | (JP) . |
| 09133005 | 5/1997 | (JP) . |
| 09242505 | 9/1997 | (JP) . |
| 10-2203 | 1/1998 | (JP) . |

* cited by examiner

*Primary Examiner*—Robert J. Sandy
*Assistant Examiner*—Karlena D. Schwing
(74) *Attorney, Agent, or Firm*—Wenderoth, Lind & Ponack, L.L.P.

(57) ABSTRACT

Rotating machine seal device is improved so that seal plate is fitted to rotating portion firmly, thereby self-induced vibration of the seal plate is reduced and occurrence of abrasion or thinning of the seal plate due to the self-induced vibration and sealing deterioration accompanying therewith are prevented. In rotating machine seal device having seal plate (2) inserted into groove (1a) provided in disc portion (1) driven rotationally, said seal device being for sealing fluid between fluid passage (12) on outer circumferential side of said groove (1a) and fluid passage (14) on inner circumferential side of said groove (1a), said seal plate (2) is divided into plural pieces along circumferential direction thereof to be inserted into said groove (1a) of the disc portion (1) and spring plate (3) is disposed on inner circumferential side of said seal plate (2) so that said seal plate (2) is pressed against seal surface (1b) of said groove (1a) by spring force of said spring plate (3). Also, said seal plate is divided into plural pieces and one piece (2d') has projection portion (5) and another piece (2d) has groove portion (6) so that they are mated with each other to be inserted into said groove (1a).

19 Claims, 5 Drawing Sheets

SEAL APPARATUS FOR ROTARY MACHINES

BACKGROUND OF THE INVENTION

1. Field of the Invention

The present invention relates to a seal device for effecting a gas seal in a rotating machine of a gas turbine and the like in which a high temperature gas flows.

2. Description of the Prior Art

FIG. 7 is a cross sectional view of a related portion of a prior art gas turbine. In FIG. 7, numeral 1 designates a turbine disc, which is fixed to a rotating shaft. Numeral 10 designates a moving blade, which is implanted in an outer circumferential portion of the turbine disc 1 and numeral 11 designates a stationary blade. A cooling air cavity 14 is formed between the turbine discs 1,1 of mutually adjacent stages and a labyrinth seal 15 is provided on an inner circumferential surface of the stationary blade 11 for effecting a gas seal between a gas path 12 and the cooling air cavity 14. Numeral 13 designates a cooling air passage for leading therethrough a cooling fluid into the cooling air cavity 14.

Numeral 2 designates a seal plate provided in the turbine discs 1, 1 on an inner side of the labyrinth seal 15. As shown in FIG. 8, the seal plate 2 is a thin metal ring, which is divided into plural pieces (two pieces in this example) in the circumferential direction. A divided part 2c has its upper and lower divided surfaces formed in stepped shapes, respectively, so as to be gas tight when they are mated with each other. The seal plate 2 is assembled into grooves 1a (see FIG. 2) provided in the mutually adjacent turbine discs 1, 1. While in operation, the seal plate 2 is pressed against outer circumferential wall surfaces 1b of the grooves 1a by the centrifugal force of the seal plate 2 itself due to a high speed rotation of the turbine discs 1,1, so that the cooling fluids is prevented from leaking into the gas path 12 side by a differential pressure between the gas path 12 and the cooling air cavity 14.

In the gas turbine using the mentioned prior art seal plate, the seal plate 2 is divided into plural pieces in the circumferential direction and so the fluid intrudes easily into the divided part 2c. Also, as the seal plate 2 is pressed against the outer circumferential wall surfaces 1b of the grooves 1a of the turbine discs 1,1 only by its own centrifugal force, the pressing force is small and self-induced vibration of the seal plate 2 is liable to occur when the fluid so intrudes. Thus, in the prior art seal structure as mentioned above, there is often caused abrasion or thinning of the seal plate 2 by the self-induced vibration, which results in the problem of deterioration of the sealing performance.

SUMMARY OF THE INVENTION

In view of the problem in the prior art, therefore, it is an object of the present invention to provide a rotating machine seal device in which a seal plate is fitted to a turbine disc securely by a large fitting force, thereby to reduce self-induced vibration of the seal plate and also to prevent abrasion or thinning of the seal plate caused by the self-induced vibration, as well as to prevent deterioration of the sealing performance associated therewith.

In order to achieve the object, the present invention provides as a first embodiment a rotating machine seal device having a seal plate inserted into a groove provided in a disc portion driven rotationally, the seal device being for sealing fluid between a fluid passage on an outer circumferential side of the groove and a fluid passage on an inner circumferential side of the groove. The seal plate is divided into plural pieces along a circumferential direction thereof to be inserted into the groove of the disc portion, and a spring plate is disposed on an inner circumferential side of the seal plate so that the seal plate is pressed against a seal surface of the groove by a spring force of the spring plate.

According to the mentioned embodiment, while the rotating machine is in operation, the seal plate receives not only its own centrifugal force but also the spring force and the centrifugal force of the spring plate to be pressed against the seal surfaces of the grooves by the combined force thereof, thus the seal of the fluid on the seal surfaces can be effected securely. Also, the combined force is strong enough for pressing the seal plate against the seal surfaces of the grooves of the disc portion such that even if the fluid intrudes into the divided part of the seal plate, self-induced vibration is reduced relative to such a self-induced vibration as in the prior art case, which results in the prevention of abrasion or thinning of the seal plate due to the self-induced vibration.

The present invention provides as a second embodiment a rotating machine seal device of the first embodiment, characterized in that the seal plate is made from a plurality of seal plates lapped one on another to be inserted into the groove, and the spring plate is disposed on an inner circumferential side of the plurality of seal plates.

According to the second embodiment, because the seal plate is made from the plurality of seal plates lapped one on another, the centrifugal force of the seal plate itself increases and the seal plate can be pressed against the seal surfaces of the grooves by a larger pressing force, which results in the further enhancement of the sealing performance. Also, by the effect of friction on the contact surfaces of the plurality of seal plates, the self-induced vibration can be reduced further.

As a third embodiment, the present invention provides a rotating machine seal device having a seal plate inserted into a groove provided in a disc portion driven rotationally, wherein the seal device is for sealing fluid between a fluid passage on an outer circumferential side of the groove and a fluid passage on an inner circumferential side of the groove. The seal plate is divided into plural pieces along a circumferential direction thereof and one piece of the seal plate in a divided part has a projection formed thereon, while the other piece thereof in the divided part has a groove formed therein so that the projection is inserted into the groove with a predetermined space remaining in the circumferential direction of the seal plate.

According to the third embodiment, the plural pieces of the divided seal plate are connected to each other in the circumferential direction with the projection and the groove of the respective seal plate pieces being mated with each other with the space therebetween, thereby the assembling work of the seal plate can be facilitated and the circumferential directional stress of the seal plate can be reduced.

BRIEF DESCRIPTION OF THE DRAWINGS

FIG. 6 is a partial front view of a seal plate of a seal device of a third embodiment according to the present invention, wherein

DESCRIPTION OF THE PREFERRED EMBODIMENTS

Figure 7:
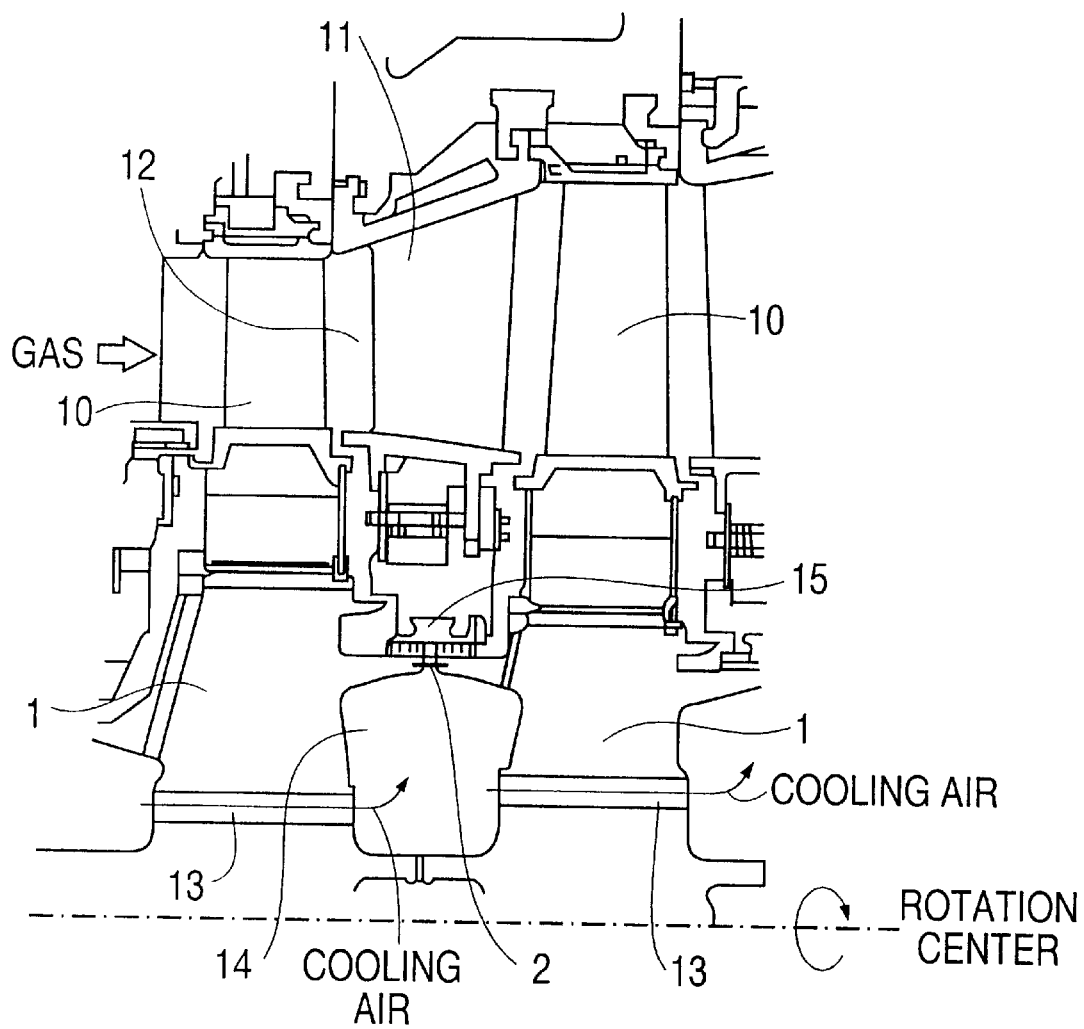
FIG. 7 is a cross sectional view of a related portion of a gas turbine in the prior art.
Figure 8:
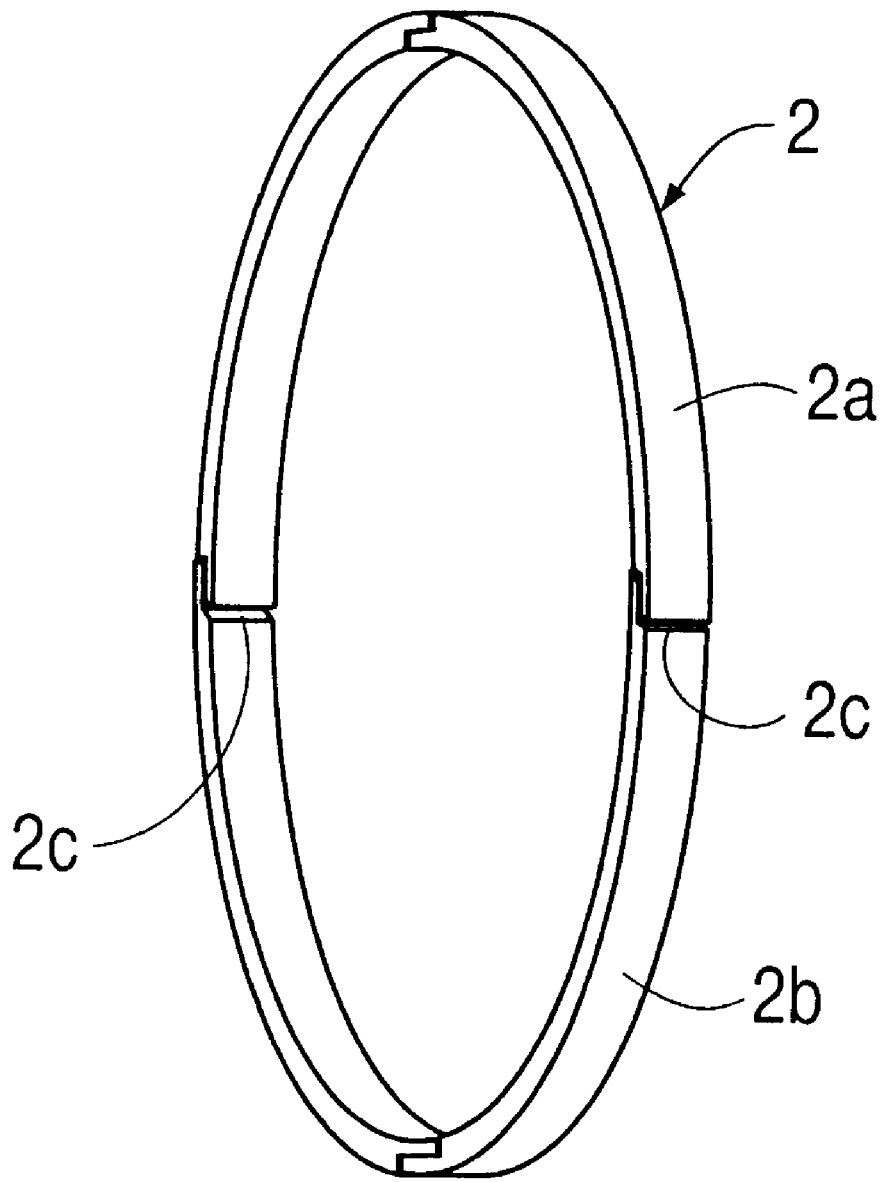
FIG. 8 is a perspective view of a seal plate in the prior art.

Description herebelow relates to a first embodiment in which the present invention is applied to a seal device of the type using the seal plate 2 for effecting a gas seal between the gas path 12 and the cooling air cavity 14 in the gas turbine shown in FIG. 7.

Figure 1:
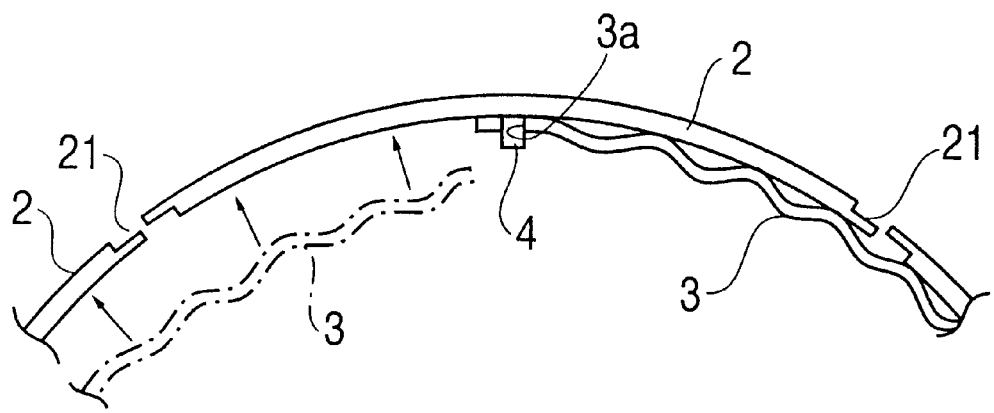
FIG. 1 is a partial front view of a seal plate and a spring plate of a gas turbine seal device of a first embodiment according to the present invention.
Figure 2:
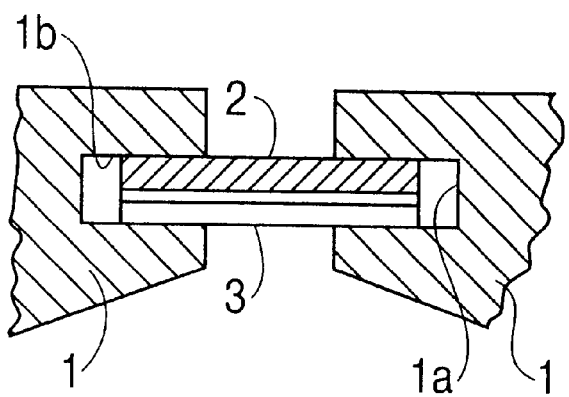
FIG. 2 is an axial directional cross sectional view of the seal device of FIG. 1.
Figure 3:
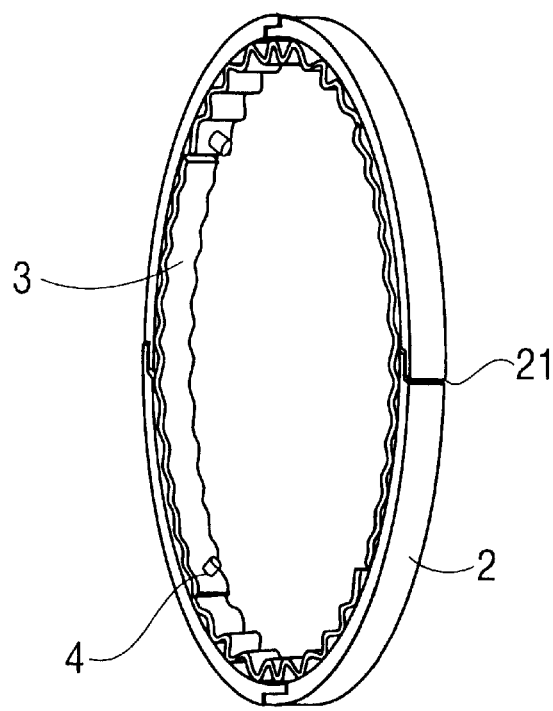
FIG. 3 is a perspective view of the seal plate and the spring plate of FIG. 1.

FIGS. 1 to 3 show a structure of the seal plate 2 and a fitting mode thereof in a seal device of the first embodiment according to the present invention.

In FIGS. 1 and 3, the seal plate 2 is a thin metal ring, which is divided into plural pieces in a circumferential direction thereof. A divided part 21 so divided has its upper and lower divided surfaces formed in stepped shapes, respectively, so as to be gas tight when they are mated with each other.

On an inner circumferential side of the seal plate 2, there is provided a separate and non-integral spring plate 3 formed in a wave shape. As shown in FIGS. 1 and 3, the spring plate 3 is divided into plural pieces in a circumferential direction thereof and has a fitting hole 3a bored at an arbitrary position thereof, so that a pin 4 projecting from an inner circumferential surface of the seal plate 2 fits in the fitting hole 3a to prevent deviation of the spring plate 3 relative to the seal plate 2 in the circumferential direction. As shown in FIG. 3, each plural piece of the spring plate spans a seam formed by adjacent plural pieces of the seal plate.

FIG. 2 shows a state where the seal plate 2 and the spring plate 3 are assembled into the turbine discs 1,1 of mutually adjacent stages. Numeral 1a designates grooves provided in the turbine discs 1,1 on an inner side of the labyrinth seal 15 (see FIG. 7) and the seal plate 2 is assembled into the grooves 1a while being pressed from its inner circumferential side by a spring force of the spring plate 3.

When the gas turbine having the seal device constructed as mentioned above is operated, a high temperature operating gas flows in the gas path 12 of the turbine and a low temperature cooling air is led into the cooling air cavity on an inner side of the seal plate 2 and the labyrinth seal 15. At this time, the turbine discs 1,1 rotate at a high speed and the seal plate 2 assembled into the grooves 1a of the turbine discs 1,1 receive not only the spring force of the spring plate 3 but also their own centrifugal force and a centrifugal force of the spring plate 3 to be pressed against the outer circumferential surfaces of the grooves 1a by the combined force thereof. Thus, leakage of the cooling air along the outer circumferential surfaces 1b of the grooves 1a caused by a differential pressure between the high temperature gas in the gas path 12 and the cooling air in the cooling air cavity 14 can be prevented securely.

Also, the seal plate 2 is fitted in the grooves 1a firmly by the spring force of the spring plate 3 and the centrifugal forces as mentioned above, thereby the seal plate 2 and the spring plate 3 are prevented from moving in the circumferential direction and there occurs no such a large self-induced vibration as in the prior art case even if the gas or cooling air intrudes in the divided part 21 of the seal plate 2. Further, a relative movement of the seal plate 2 and the spring plate 3 is prevented by the pin 4 and there occurs no case of deviation between both of them.

Figure 4:
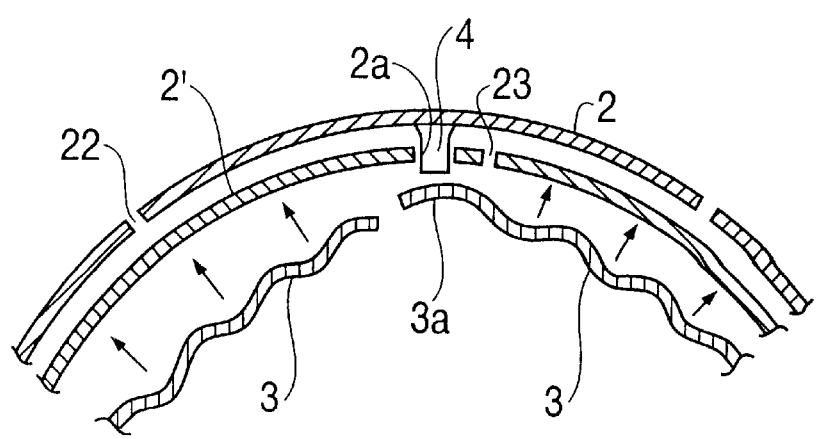
FIG. 4 is a cross sectional partial front view of a seal device of a second embodiment according to the present invention.
Figure 5:
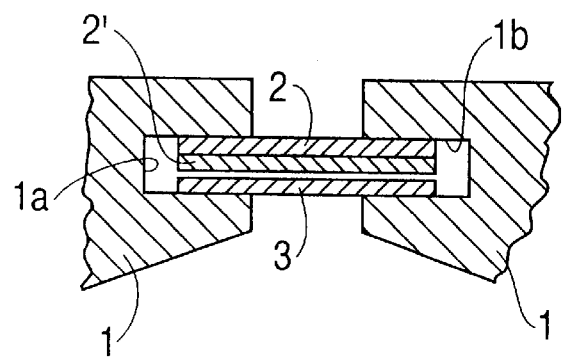
FIG. 5 is an axial directional cross sectional view of the seal device of FIG. 4.

FIGS. 4 and 5 show a seal device of a second embodiment according to the present invention, wherein FIG. 4 is a cross sectional partial front view of a seal plate and a spring plate and FIG. 5 is a cross sectional view showing a fitting state of the seal device.

In the present embodiment, two seal plates or inner and outer seal plate members 2, 2' (seal plate members of more than two are also applicable) are provided being lapped one on another in a radial direction thereof That is, in FIGS. 4 and 5, numeral 2 designates an outer seal plate member and numeral 2' designates an inner seal plate member. Both the seal plate members 2, 2', being mutually lapped in the radial direction as shown in FIG. 5, are inserted into the grooves 1a of the turbine discs 1,1 and a separate and non-integral spring plate 3 which is substantially the same as that of the first embodiment is fitted on the inner circumferential surface of the inner seal plate member 2'.

Both the outer seal plate member 2 and inner seal plate member 2' are divided into plural pieces in the circumferential direction. Numeral 22 designates a divided part of the outer seal plate member 2 and numeral 23 designates a divided part of the inner seal plate member 2'. The outer seal plate member 2 has a pin 4 projecting from its inner circumferential surface at an arbitrary position thereof, and the inner seal plate member 2' and the spring plate 3 have fitting holes 2a and 3a, respectively. Thus, by the pin 4 fitting in the fitting holes 2a, 3a, the three members, seal plate members 2, 2' and the spring plate 3, are prevented from deviating mutually in the circumferential direction.

In the present embodiment, the two seal plate members are provided being lapped one on another, thereby the centrifugal force of the two seal plate members 2, 2' increases to enhance the sealing performance. At the same time, friction on the contact surface of the outer seal plate member 2 and the inner seal plate member 2' provide a damping action of the self-induced vibration, thereby the self-induced vibration is reduced further than in the first embodiment.

Figure 6A:
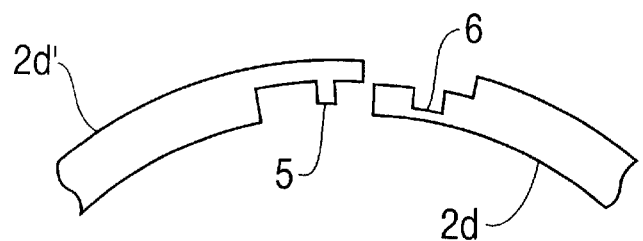
FIG. 6(A) shows a state before the seal plate is assembled and FIG. 6(B) shows a state after the seal plate is assembled.
Figure 6B:
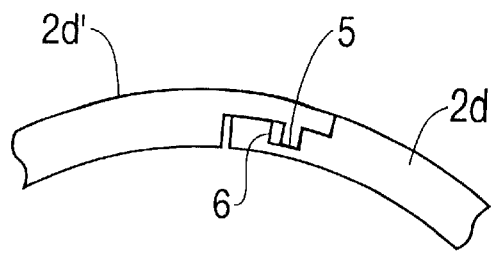

FIGS. 6(A) and 6(B) show a seal plate used in a seal device of a third embodiment according to the present invention, wherein FIG. 6(A) is a partial front view of the seal plate before it is assembled and FIG. 6(B) is a same view after the seal plate is assembled.

In FIGS. 6(A) and 6(B), there is a projection 5 on a gas tight inner circumferential surface of one piece 2d' of the seal plate divided along the circumferential direction, and there is a groove 6 in a gas tight outer circumferential surface of the other piece 2d. The groove 6 is formed with its circumferential directional width being made larger than a circumferential directional width of the projection 5 and, as shown in FIG. 6(B), when the seal plate including the pieces 2d, 2d' whose gas tight surfaces are lapped one on another is fitted into the grooves 1a of the turbine discs 1,1 (see FIG. 2), a small relative movement between the seal plate pieces in the circumferential direction is allowable so as to facilitate the assembling work as well as reduce a circumferential directional stress of the seal plate caused under a high temperature and high load operation.

Industrial Applicability

As described concretely based on the embodiments, according to one aspect of the present invention, there is acting the centrifugal force of the seal plate on itself and in addition thereto, there are acting the spring force and the centrifugal force of the spring plate, thereby the seal plate is pressed strongly against the seal surfaces so that the sealing ability on the seal surfaces is enhanced further than in the prior art case. Additionally, the self-induced vibration caused by intrusion of the fluid into the divided part of the seal plate can be suppressed. Thus, occurrence of the sealing deterioration due to abrasion or thinning of the seal plate can be prevented.

Also, according to a second aspect of the present invention, the plurality of the seal plates are lapped one on another, thereby the centrifugal force of the seal plates increases to increase the pressing force onto the seal surfaces, which results in the further enhancement of the sealing performance as well as in the further suppression of the self-induced vibration by the damping action due to mutual contact of the seal plates.

Further, according to a third aspect of the present invention, assembling work of the seal plate is facilitated by the seal plate having freedom in the circumferential direction, whereby the circumferential directional stress can also be reduced.

What is claimed is:

1. A rotating machine seal device to be inserted into a groove of a disc that is to be driven rotationally, wherein the seal device is for sealing fluid between a fluid passage on an outer circumferential side of the groove and a fluid passage on an inner circumferential side of the groove, said rotating machine seal device comprising:

a seal plate that is to be inserted into the groove; and a spring plate that is non-integral with said seal plate, wherein said spring plate is positioned on an inner circumferential side of said seal plate such that said spring plate resiliently urges said seal plate against a seal surface of the groove when said seal plate is in the groove.

2. The rotating machine seal device according to claim 1, wherein said seal plate comprises plural circumferential pieces.

3. The rotating machine seal device according to claim 2, wherein said seal plate comprises an inner circumferential seal plate member and an outer circumferential seal plate member lapped on said inner circumferential seal plate member, and wherein said spring plate is positioned on an inner circumferential side of said inner circumferential seal plate member.

4. The rotating machine seal device according to claim 3, further comprising a projection-hole arrangement to position said outer circumferential seal plate member, said inner circumferential seal plate member and said spring plate relative to one another.

5. The rotating machine seal device according to claim 4, wherein said projection-hole arrangement comprises a radially extending projection on one of said outer circumferential seal plate member and said spring plate and a first opening in the other of said outer circumferential seal plate member and said spring plate, and also comprises a second opening in said inner circumferential seal plate member, such that said first and second openings are to receive said radially extending projection and thereby position said spring plate, said outer circumferential seal plate member and said inner circumferential seal plate member relative to one another.

6. The rotating machine seal device according to claims 5, wherein said radially extending projection is provided on said outer circumferential seal plate member and said first opening is provided in said spring plate.

7. The rotating machine seal device according to claim 3, wherein said outer circumferential seal plate member, said inner circumferential seal plate member and said spring plate each have an annular configuration.

8. The rotating machine seal device according to claim 3, wherein said spring plate has a wavy configuration.

9. The rotating machine seal device according to claim 2, wherein one of said plural circumferential pieces includes a radially extending projection, and another of said plural circumferential pieces includes a circumferentially extending groove, and wherein said radially extending projection is to be received within said circumferentially extending groove such that said radially extending projection is free to move along a circumferential direction within said circumferentially extending groove.

10. The rotating machine seal device according to claim 9, wherein said radially extending projection extends radially inwardly from said one of said plural circumferential pieces and said circumferentially extending groove is provided in an outer circumferential surface of said another of said plural circumferential pieces.

11. The rotating machine seal device according to claim 9, wherein said spring plate has a wavy configuration.

12. The rotating machine seal device according to claim 9 wherein said spring plate and said seal plate each have an annular configuration.

13. The rotating machine seal device according to claim 2, wherein said spring plate comprises plural circumferential pieces.

14. The rotating machine seal device according to claim 13, wherein adjacent ones of said plural circumferential pieces of said seal plate define a seam therebetween, and wherein a respective one of said plural circumferential pieces of said spring plate spans a respective said seam.

15. The rotating machine seal device according to claim 1, further comprising a projection-hole arrangement to position said spring plate relative to said seal plate.

16. The rotating machine seal device according to claim 15, wherein said projection-hole arrangement comprises a radially extending projection on one of said seal plate and said spring plate and an opening in the other of said seal plate and said spring plate, such that said opening is to receive said radially extending projection and thereby position said spring plate relative to said seal plate.

17. The rotating machine seal device according to claim 16, wherein said radially extending projection is provided on said seal plate and said opening is provided in said spring plate.

18. The rotating machine seal device according to claim 1, wherein said spring plate has a wavy configuration.

19. The rotating machine seal device according to claim 1, wherein said spring plate and said seal plate each have an annular configuration.

* * * * *